UNITED STATES PATENT OFFICE.

TERENCE SPARHAM, OF BROCKVILLE, ONTARIO, CANADA.

ROOFING-CEMENT.

SPECIFICATION forming part of Letters Patent No. 229,924, dated July 13, 1880.

Application filed November 8, 1879.

*To all whom it may concern:*

Be it known that I, TERENCE SPARHAM, of the town of Brockville, in the county of Leeds, in the Province of Ontario, in the Dominion of Canada, doctor of medicine, have invented a new and useful Roofing-Cement, which I have called "Sparham's Fire-Proof Roofing-Cement," which is fully described in the following specification.

My invention relates to an improved roofing cement or composition, and has for its object the production of a cheap and effective roofing composition adapted to be applied in a plastic state, and which when so applied and hardened shall be both water and fire proof; and it consists of a roofing cement or composition, as a new article of manufacture, composed of plumbago and soapstone finely powdered and thoroughly mixed with coal-tar or other liquid bituminous substance, in the proportions and manner hereinafter fully described.

In preparing this cement or roofing compositon, I take plumbago and soapstone in the proportion of one part of plumbago to three parts of soapstone, powder them finely, and mix them thoroughly together. To this mixture I add enough coal-tar or other liquid bitumnous substance to give the mixture such a consistency that the composition resulting shall be sufficiently plastic to enable it to be readily and easily spread upon the roof or other object to which it is desirable to apply it.

Generally the proportion of coal-tar or other liquid bituminous substance will be about one part of bituminous liquid to two parts of the powdered mixture; but as the consistency of coal-tar varies considerably at different times, I do not confine myself to the proportions above named, but vary the amount of coal-tar according to its quality and consistency, as otherwise the consistency of the cement or composition would be too variable. It is also evident that the proportions of the powdered ingredients may be somewhat varied without materially detracting from the effective qualities of the composition as a practical roof-covering.

This composition makes a very tough elastic roofing, not liable to crack, perfectly fire and water proof, the plumbago serving as a very efficient binding material to hold the soapstone together, and makes a more durable roofing than powdered clay, steatite, mica, and asphalt, which, I am aware, have been used to form a roofing composition.

What I claim as new, and desire to secure by Letters Patent of the United States, is—

A roofing cement or composition composed of powdered plumbago, soapstone, and coal-tar or other liquid bituminous substance, united in about the proportions herein set forth, as a new article of manufacture.

T. SPARHAM.

Witnesses:
 LUTHER HALL BELLAMY,
  *Of the town of Brockville.*
 TERENCE HAMILTON,
  *Of Merrick, of the town of Brockville.*